May 24, 1960 R. E. DUCE 2,937,827

COUNTER-ROTATING PROPELLERS AND DUAL ENGINE SAFETY SYSTEM

Filed Jan. 28, 1957 3 Sheets-Sheet 1

*INVENTOR.*
RALPH E. DUCE
*BY*
*Knox & Knox*

COUNTER-ROTATING PROPELLERS AND DUAL ENGINE SAFETY SYSTEM

Filed Jan. 28, 1957 3 Sheets-Sheet 2

INVENTOR.
RALPH E. DUCE
BY
Knox & Knox

May 24, 1960 R. E. DUCE 2,937,827
COUNTER-ROTATING PROPELLERS AND DUAL ENGINE SAFETY SYSTEM
Filed Jan. 28, 1957 3 Sheets-Sheet 3
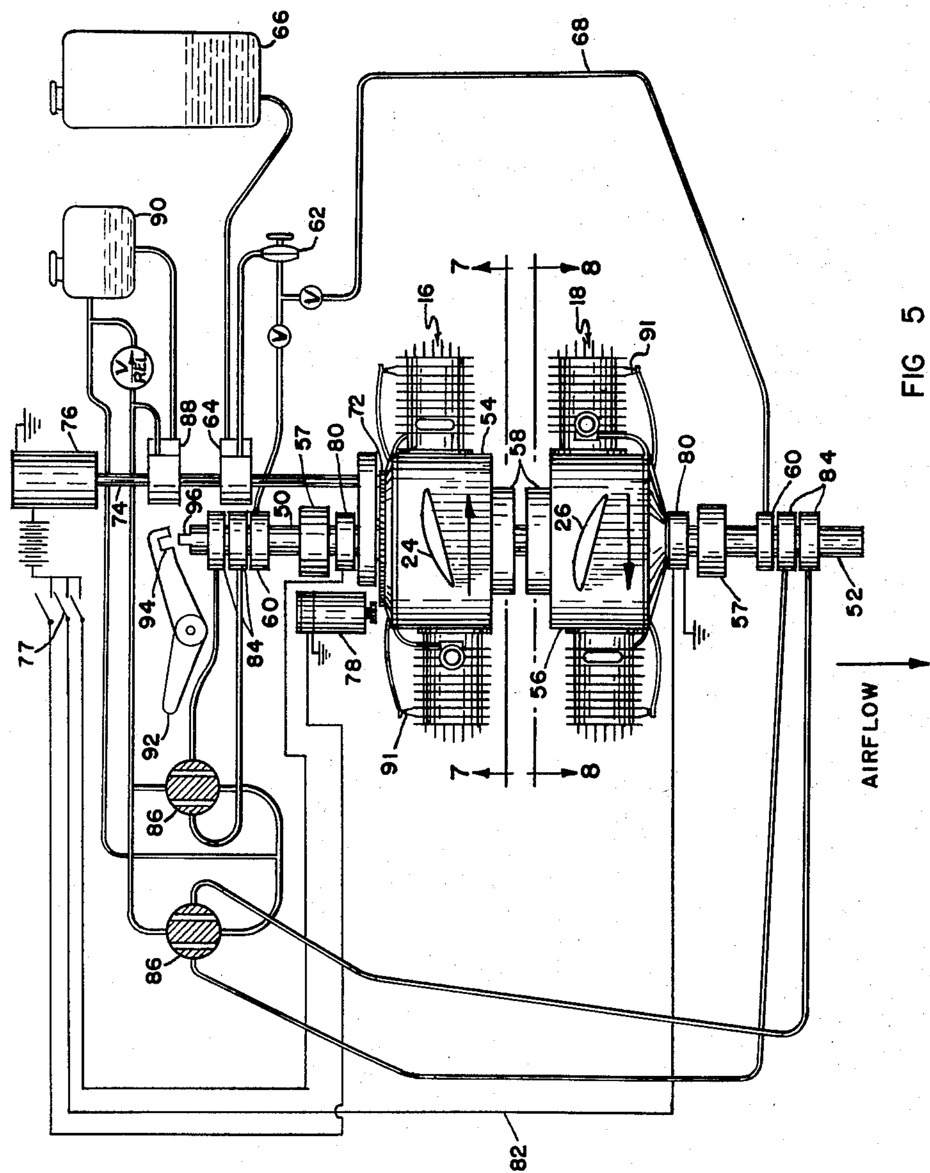
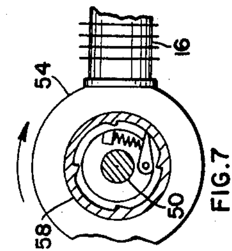
FIG.8
INVENTOR.
RALPH E. DUCE
BY
Knox & Knox United States Patent Office 2,937,827

Patented May 24, 1960

1

2,937,827

COUNTER-ROTATING PROPELLERS AND DUAL ENGINE SAFETY SYSTEM

Ralph E. Duce, R.R. 4, Box 711, Valley Center, Calif.

Filed Jan. 28, 1957, Ser. No. 636,701

5 Claims. (Cl. 244—65)

The present invention relates generally to aircraft and more particularly to an aircraft of unique plan form and capable of vertical take-off and landing. Still more specifically, this invention relates to the provision of an aircraft having a specially designed plan form and a dual engine power plant with contra-rotating propellers, the airframe being designed with a view toward making the control of the rear engine easily accomplished, and the dual engine system being characterized by a novel arrangement of engines.

The primary object of this invention is to provide an improved airframe and power plant combination in an aircraft capable of taking off and landing vertically and capable of sustained flight in either the vertical or any other attitude with the danger normally attendant on failure of one of the engines eliminated.

Another object of this invention is to provide a dual engine system so arranged through the use of a common component, or connected components, and one-way clutches that failure of one engine results in the transfer of one-half of increased available power from the remaining engine to the propeller normally driven by the faulty engine, all without any material lapse or interruption of power output. In this connection, it is important to note that an engine suitable for this use has been developed, this engine being characterized by the ability to double its revolutions and at the same time to increase its horsepower to approximately 140% of the take-off power, which is equivalent to the power required to sustain hovering flight in the aircraft. It is believed unnecessary to detail the construction of such engines in the present disclosure.

Another object of this invention is to provide a dual engine safety system in which two engines of rotary type are so arranged that the torque generated within each engine is counteracted by the torque of the mating engine in a unique manner, the two engines being mounted within the airframe by means of carrier bearings, thereby permitting the engines and propellers to contra-rotate freely with respect to the airframe and eliminating all transfer of torque to the airframe.

Still another object of this invention is to provide a dual engine safety system with novel means for starting the second engine, when these engines are located, as illustrated, near the aft end of the airframe.

Another object which is noteworthy is the provision of an airframe and a dual engine system combination which is ideally suited for use in aircraft for vertical take-off and landing, at least one of the propellers being mounted close to the aft end of the aircraft and exceptionally close to the control surfaces of the aircraft, in such manner that complete maneuverability is attained, and the take-off and landing of such aircraft is greatly facilitated.

With these objects definitely in view, together with other objects which will appear hereinafter to those skilled in the art as this description proceeds, this invention consists in the novel construction, combination and arrangement of elements and portions, as will be hereinafter fully described in this specification, particularly pointed out in the claims and illustrated in the drawings which form a material part of the disclosure and in which:

Figure 5 is a diagrammatic view indicating the means of operation and control in relation to the two engines, this view being also proposed as indicating how the airframe disclosed and illustrated in this application is particularly well adapted for supporting the necessary control lines for the rear engine in such a system;

Figures 7 and 8 are somewhat diagrammatic vertical sectional views on the corresponding section lines in Figure 5.

Similar characters of reference indicate similar or identical elements and portions throughout the specification and throughout the different views in the drawings.

Figure 1:
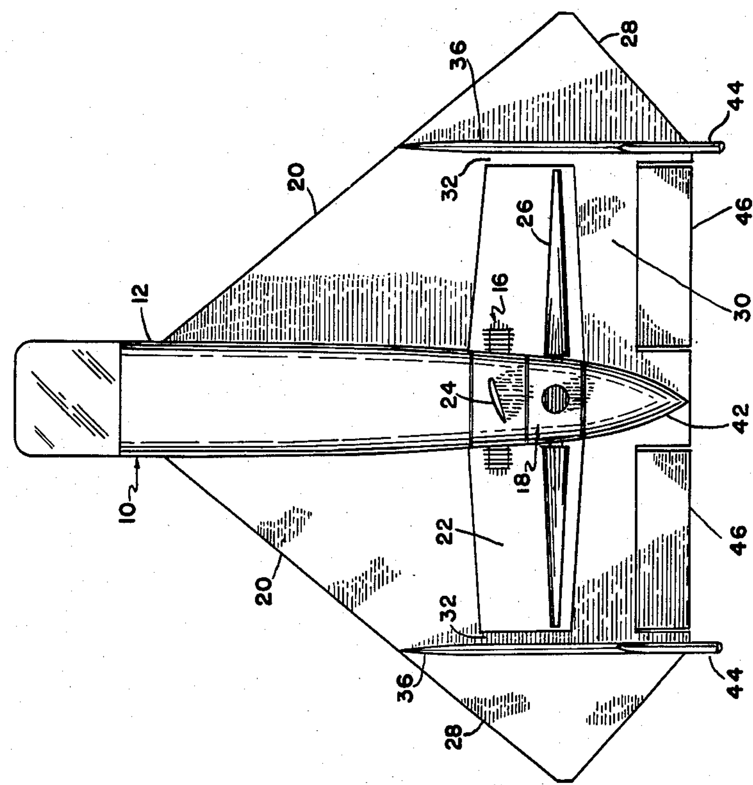
Figure 1 is an elevational view of the aircraft in the vertical take-off position, showing those portions of the aircraft which are uppermost when the aircraft is in cruising attitude.

Referring now to the drawings, the aircraft includes a fuselage 10 having a forward compartment 12 for the pilot and the controls, some of which controls are illustrated in Figure 5. The fuselage also includes a midsection which houses at least major portions of the dual engine system which may be considered as consisting of a front engine 16 and a rear engine 18. Wing 20 is secured to the sides of the fuselage 10, in opposing relation, and propeller opening 22 is provided in the wing, adjacent to the aft end of the aircraft, for the front propeller 24 and the rear propeller 26.

Figure 2:
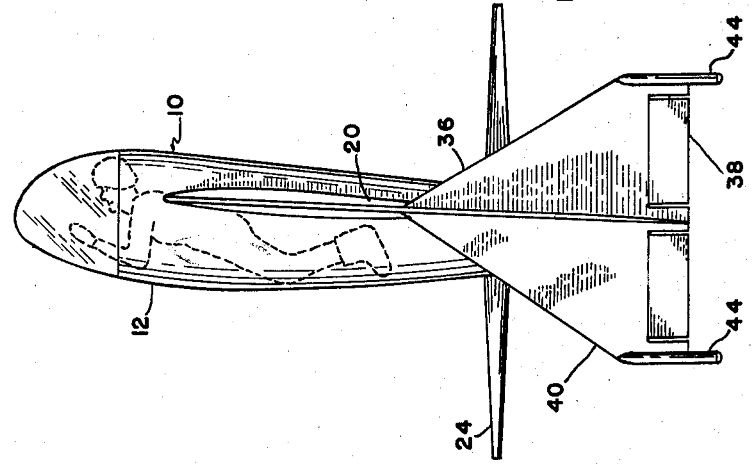
Figure 2 is a side elevational view of the aircraft in vertical take-off position.
Figure 3:
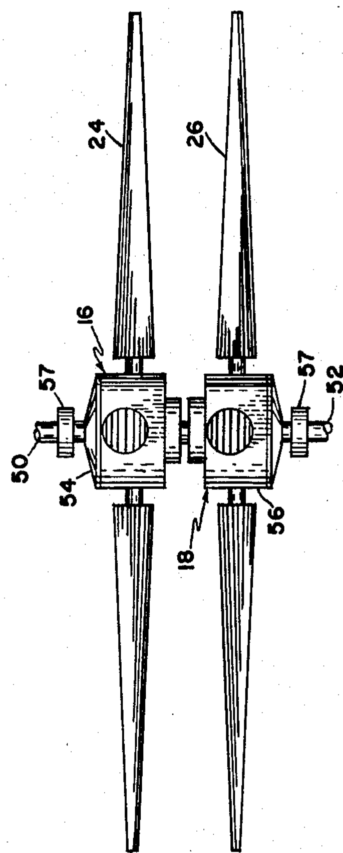
Figure 3 is a plan view of the dual engine propeller system.
Figure 4:
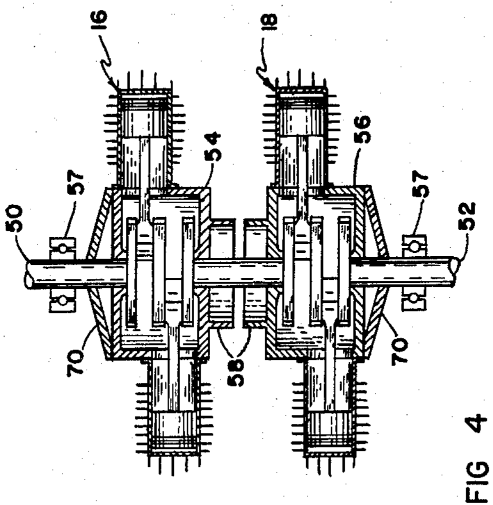
Figure 4 is a longitudinal central sectional view of the dual engine system, this view, as are all the rest of the views, being somewhat schematic in character and fragmentary and this view also being enlarged with respect to the showing of the same parts in Figure 3.

The wings are provided with wing tips 28 and as illustrated, define a generally back-swept configuration. A stabilizer constituting a portion to the rear of the openings, identified by the numeral 30 may be considered a portion of the wing structure, and the portions 32 disposed radially outward of the propeller tips constitute bridges or support means for the said stabilizer 30. Left and right upper fins 36 and left and right rudders 38 thereon are provided, along with the left and right lower fins, one of which is shown at 40 in Figure 2. The streamlined tail section 42 of the fuselage houses the rear bearings 57, and landing gear 44 of the caster-type may be mounted on the fins 36 and 40. Elevons 46 complete the main portions of the airframe, it being understood that the foregoing description of the airframe is proposed as being detailed sufficiently only to show how this airframe is adapted for use with the dual engine and propeller system which will now be described specifically.

The engines 16 and 18 are of rotary type and the crankshaft 50 of the front engine 16 is rigidly connected to the crankshaft 52 of the rear engine 18, it being very important to note that the rear engine is reversed in reference to the front engine. Since the engines are of rotary type, the front engine will be understood to have a crankcase and cylinder assembly, diagrammatically illustrated at 54, mounted for rotation as a unit in reference to the crankshaft 50, and the rear engine 18 has a similar crankcase and cylinder assembly 56 which rotates in the opposite direction about the corresponding crankshaft 52. Of course, it will be understood that the crankshafts must be operatively linked together and may be either rigidly connected together or formed as a unitary element as illustrated in the drawings. It is also extremely important to note that the engines must be of identical horsepower and must have as nearly as possible identical operational characteristics.

Since the engines are identical and in reverse relation, the torque generated by the different engines is equal and opposite and the propellers 24 and 26 are driven at equal speeds in opposite directions. The torsional reaction on the crankshaft 50 is also equal and opposite to the torsional reaction on the crankshaft 52, with the result that the crankshafts, connected as they are, remain static while the assemblies 54 and 56 rotate, if the speed of rotation of the propellers is the same. However, this invention is designed to provide for optimum safety in the event that one engine should fail, and carrier bearings are provided for the crankshafts 50 and 52 to permit rotation of the two crankshafts when such failure is encountered.

Upon failure of one engine, the crankshafts begin to rotate and the crankcase and cylinder assembly of the failed engine begins to rotate with the crankshafts. Both propellers will be maintained at approximately the original rate of rotation and the remaining, operating engine will therefore substantially double its r.p.m. Obviously the engines must be designed to enable such doubling of the speed of rotation while still remaining efficient, and such engines have been developed.

Means are provided to lock the failed engine to the corresponding crankshaft to prevent a pumping action in the failed engine and loss in efficiency of the system when operating on a one-engine basis. To effect this locking action, one-way clutches 58 are installed on the crankshafts 50 and 52, these clutches being preferably of the type known as sprag clutches. These clutches permit the normal rotation of the assemblies 54 and 56 relative to the crankshafts 50 and 52 and these clutchs also permit the rotation of the crankshafts in the same direction as one of said assemblies 54 and 56. In other words upon failure of one of the engines, the crankshafts are permitted to rotate and the clutch associated with failed engine assures that this failed engine shall rotate with the crankshafts.

At this point in the disclosure, it is believed to be important to point out that the term "rotary type" is applied to the engines in a broad sense and it is conceived the crankshafts may rotate independently and in opposite directions while the crankcase and cylinder assemblies 54 and 56 may be secured together as a unit. With this in mind, it is proposed that the term "torque delivering component" be considered as descriptive of the components of the engines secured to the propellers 24 and 26, while the term "reaction component" be considered as descriptive of the elements which are rigidly secured together and which do not rotate during normal operation with both engines functioning.

As mentioned above, it is a feature of this invention that one of the propellers shall be close to the aft end of the aircraft and the openings 22 are such that portions 32 provide for the remote control lines for the rear engine 18, with such elements as the necessary switches and valves being located in a forepart of the aircraft. One of the problems solved by this invention is the provision for proper support for the rear engine and for such routing of the remote control lines. The fuel system includes fuel slip rings 60, a fuel pressure regulator 62 and fuel pump 64, along with a fuel tank 66, and the fuel lines 68 leading to the rear engine are offset, as indicated in Figure 5, to reach the rear engine by way of the said portion 32 of the wings. One engine has an accessory casing 70 with a ring gear 72 and an accessory drive shaft 74. A generator 76 is indicated as operated by this drive shaft 74, along with such other units as the fuel pump 64. The front engine has a starter 78 and the rear engine may be started by the propeller wash from the front engine. Each engine has ignition slip rings 80, and the electric line 82 leads from the generator 76 through a suitable switch 77 to the slip ring 80 of the rear engine. The hydraulic system includes engine controls such as the hydraulic fluid slip ring 84 for propellers pitch control on each engine with the necessary valves 86, hydraulic fluid pump 88 and reservoir 90, the connection to the rear engine being facilitated by the existence of the portion 32 of the wing. Of course, the stabilizer 30 functions as a support for the rear bearing of the rear engine 18 and this stabilizer is, in turn, supported by the portions 32 of the wings. Glow plugs 91 are indicated as ignition means although the principal consideration in regard to ignition is the desirability of some form of remote control for the rear engine as represented by the switch 77.

Another problem solved by this invention is the provision of means for easily starting the engines. To effect this, an arrester lever 92, or the equivalent thereof, is operatively associated with the forward end of the crankshaft 50, the lever having an end slot as at 94 or being otherwise formed with a non-circular portion which engages a key or functionally analogous element indicated at 96, all as diagrammatically illustrated in Figure 5. When the lever 92 is made to engage the key 96, the crankshafts are prevented from turning while the engines are being started. The crankshafts are then released, since these crankshafts remain static or substantially static during normal operation of both engines.

Figure 6:
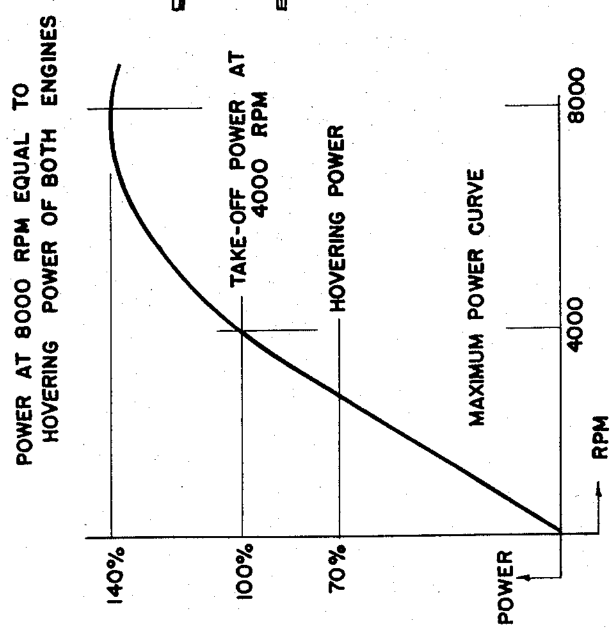
Figure 6 is a graphical representation of the operational characteristics of a suitable engine for use in this invention.

The operation of the present invention will be clear from the foregoing description of the mechanical details thereof, taken with the recited objects and the drawings. In recapitulation, however, it may be added that in starting the engines, when the engines are arranged as illustrated, the crankshafts are prevented from turning by means of the arrester 92 while the front engine is being started. The rear engine is then started easily since its propeller is in the slip stream of the forward propeller. Vertical take-off is followed by horizontal flight and hovering as desired. In such hovering, each engine will be developing approximately 70% of its potential take-off power and in the event of failure of one engine, inertial forces in the torque delivering component of the failed engine and its propeller will at first help to sustain rotation thereof in the original direction and the pumping action in the failed engine will tend to start the reaction component of the good engine to rotate with the propeller of the failed engine, thereby assisting the functioning engine to begin operating with its reaction component accelerating from zero to a speed equal and opposite to its torque delivering component, which is tantamount to doubling its actual revolutions while still driving its propeller at the original hovering speed. This means that the functioning engine must be capable of 140% of its rated take-off power, represented by this doubling of the revolutions of its torque delivering component relative to its reaction component. In the illustrated form this means that the functioning engine propeller maintains its hovering revolutions and the crankshafts and failed engine are now rotating at an equal speed in the opposite direction. Reference to the graph of Figure 6 is invited, this graph showing the operating characteristics of a suitable engine at 4000 and 8000 revolution per minute.

I realize that considerable variation from the forms of the elements disclosed in the foregoing description and the drawing can be resorted to without departure from the spirit and scope of this invention. For example, the engines may be of geared rotary type, and may be spaced axially with only the rear propeller operating in the openings 22. In other words, this disclosure is proposed as illustrative rather than limiting, the drawings being recognized as quite diagrammatic and designed only to illustrate how this invention can be reduced to practice by those reasonably skilled in the art to which this invention appertains.

I claim:

1. In an aircraft: an airframe; propulsion means comprising two engines of equal horsepower and operatively mounted on said airframe; each of said engines having a torque delivering component and a reaction component; said reaction components being coupled together and mounted for rotation, when required as in the event of failure of one engine, relative to said airframe; said torque delivering components being contra-rotating; means, operative in the event of failure of one of said engines, to lock together the torque delivering and reaction components of said one failed engine for rotation as a unit with the torque reaction component of the other engine, and propellers operatively connected to each of said torque delivering components.

2. In an aircraft: an airframe; propulsion means comprising two rotary type engines of equal horsepower; each of said engines having a torque delivering component and a reaction component; the torque delivering components being mounted on the reaction components for rotation about a common axis; the reaction components being coupled together and mounted on said airframe for rotation about said axis, said torque delivering components having normal rotation in opposite directions and said reaction components remaining relatively static during normal operation; means, operative in the event of failure of one of said engines, to lock together the torque delivering and reaction components of said one failed engine for rotation as a unit with the torque reaction component of the other engine; and propellers operatively connected to each of said torque delivering components.

3. In an aircraft: an airframe; propulsion means comprising two rotary type engines of equal horsepower; each of said engines having a torque delivering component and a reaction component; the torque delivering components being mounted on the reaction components for rotation about a common axis; the reaction components being coupled together and mounted on said airframe for rotation about said axis, whereby said torque delivering components have normal rotation in opposite directions and said reaction components remain relatively static during normal operation; means, operative in the event of failure of one of said engines, to lock together the torque delivering and reaction components of said one failed engine for rotation as a unit with the torque reaction component of the other engine; and propellers operatively connected to each of said torque delivering components; and an arrester operatively connected with said reaction components for temporarily inhibiting rotation thereof while the engines are being started.

4. In an aircraft: an airframe; propulsion means comprising two rotary type engines of equal horsepower; each of said engines having a torque delivering component and a reaction component; the torque delivering components being mounted on the reaction components for rotation about a common axis; the reaction components being rigidly connected together and mounted on said airframe for rotation about said axis, whereby said torque delivering components have normal rotation in opposite directions and said reaction components remain relatively static; propellers operatively connected to each of said torque delivering components; and one-way clutches operatively connected between said torque delivering components and the corresponding reaction components and permitting said normal rotation while inhibiting the reverse rotation of the torque delivering components relative to the reaction components; said clutches also permitting rotation of said reaction components in the same direction as one of said torque delivering components, whereby upon failure of one engine both torque delivering components continue to rotate in the same direction as in said normal rotation.

5. Apparatus according to claim 2 wherein said reaction components are the crankshafts of the engines and said torque delivering components include the cylinders of the corresponding engines.

References Cited in the file of this patent

UNITED STATES PATENTS

| | | |
|---|---|---|
| 1,132,368 | Lorenc | Mar. 16, 1915 |
| 1,210,409 | Brooke | Jan. 2, 1917 |
| 1,966,300 | Leka | July 10, 1934 |
| 2,406,625 | Oglesby | Aug. 27, 1946 |